US012271649B2

United States Patent
Imaizumi et al.

(10) Patent No.: US 12,271,649 B2
(45) Date of Patent: Apr. 8, 2025

(54) INFORMATION PROCESSING APPARATUS, INFORMATION PROCESSING METHOD, AND NON-TRANSITORY COMPUTER-READABLE MEDIUM WITH DETERMINATION OF WHETHER CAPTURED IMAGE IS DUAL-LENS IMAGE

(71) Applicant: CANON KABUSHIKI KAISHA, Tokyo (JP)

(72) Inventors: Tsubasa Imaizumi, Kanagawa (JP); Genya Yoshizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/347,640

(22) Filed: Jul. 6, 2023

(65) Prior Publication Data
US 2024/0020073 A1    Jan. 18, 2024

(30) Foreign Application Priority Data
Jul. 12, 2022  (JP) .................................. 2022-111787

(51) Int. Cl.
*G06F 3/0484*    (2022.01)
*G06F 3/04847*   (2022.01)
*G06F 3/14*      (2006.01)
*G06T 3/40*      (2006.01)

(52) U.S. Cl.
CPC . *G06F 3/14* (2013.01); *G06T 3/40* (2013.01)

(58) Field of Classification Search
CPC ...... G06F 3/14; G06F 3/0484; G06F 3/04847; G06T 3/40
See application file for complete search history.

(56) References Cited

U.S. PATENT DOCUMENTS

| | | | | |
|---|---|---|---|---|
| 8,854,432 B2* | 10/2014 | Orimoto | .............. | H04N 13/246 |
| | | | | 348/47 |
| 9,736,391 B2* | 8/2017 | Du | .......................... | H04N 23/71 |
| 10,447,918 B2* | 10/2019 | Kobayashi | ........... | H04N 5/2624 |
| 10,623,648 B2* | 4/2020 | Kondo | .................. | G06F 3/0482 |
| 11,706,396 B2 | 7/2023 | Yoshida et al. | | |

(Continued)

FOREIGN PATENT DOCUMENTS

JP    2022-046260 A    3/2022

OTHER PUBLICATIONS

Dec. 1, 2023 European Official Action in European Patent Appln. No. 23184710.4.

*Primary Examiner* — Mahelet Shiberou
(74) *Attorney, Agent, or Firm* — Venable LLP

(57) ABSTRACT

An information processing apparatus controls a display to display a first item and a second item together with a captured image, each of the first item and the second item including a plurality of setting items. The information processing apparatus determines whether the captured image is a dual-lens image that includes a first area and a second area having a parallax with respect to the first area. The information processing apparatus: 1) controls the display to display both the first area and the second area at a first display magnification in a case where the first item is selected; and 2) controls the display to display only one of the first area and the second area at a second display magnification higher than the first display magnification in a case where the second item is selected.

16 Claims, 10 Drawing Sheets

(56) References Cited

U.S. PATENT DOCUMENTS

| | | | |
|---|---|---|---|
| 2012/0062693 A1* | 3/2012 | Hada .................... | H04N 23/632 |
| | | | 348/240.2 |
| 2013/0258044 A1* | 10/2013 | Betts-Lacroix ........ | H04N 23/45 |
| | | | 348/E5.09 |
| 2017/0272589 A1* | 9/2017 | Yoshimi ................. | G06F 3/0482 |
| 2019/0289201 A1* | 9/2019 | Nishimura ........... | H04N 13/239 |
| 2022/0078394 A1 | 3/2022 | Yoshida et al. | |

* cited by examiner

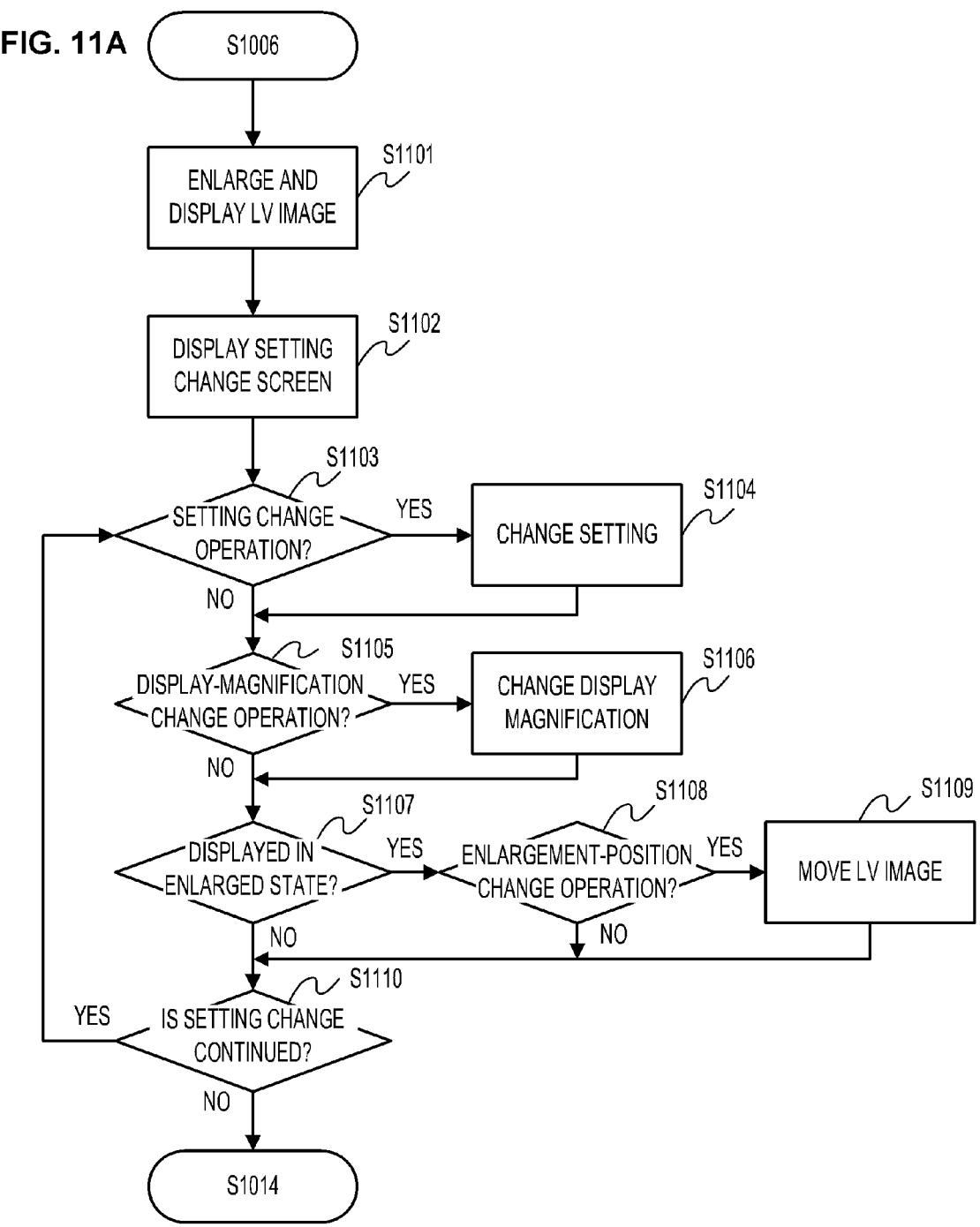

INFORMATION PROCESSING APPARATUS, INFORMATION PROCESSING METHOD, AND NON-TRANSITORY COMPUTER-READABLE MEDIUM WITH DETERMINATION OF WHETHER CAPTURED IMAGE IS DUAL-LENS IMAGE

BACKGROUND OF THE INVENTION

Field of the Invention

The present invention relates to a technique for displaying an image including two areas having a parallax therebetween.

Description of the Related Art

In recent years, digital cameras having two lens optical systems have been known. When two optical systems are disposed to capture images in the same direction, two images having a parallax therebetween are acquired.

Japanese Patent Application Laid-Open No. 2022-046260 discloses a technique for creating, from such two images, an image (a hemispherical image) having a range of 180 degrees in front of a digital camera or a stereoscopic view image.

SUMMARY OF THE INVENTION

When the digital camera having two optical systems as described above captures an image, two image areas acquired through the two optical systems are displayed on one image (screen). In this case, when a certain adjustment process is performed on the image, if each of the image areas is displayed in a small size, a user may find it difficult to check for details of a specific portion of the image. On the other hand, when another process is performed on the image, the user may wish to check the entire image including two image areas, rather than checking for details of a specific portion.

Therefore, in the present invention, an information processing apparatus displays an image including two areas having a parallax therebetween such that the user can easily perform desired processing thereon.

An aspect of the present invention is an information processing apparatus including: a processor; and a memory storing a program which, when executed by the processor, causes the electronic apparatus to: acquire a captured image; control a display to display a first item and a second item together with the captured image, each of the first item and the second item including a plurality of setting items; determine whether the captured image is a dual-lens image that includes a first area acquired by imaging through a first shooting lens and a second area acquired by imaging through a second shooting lens, the second area having a parallax with respect to the first area; control the display to display both the first area and the second area of the captured image at a first display magnification in a case where the captured image is determined to be the dual-lens image and any one of the setting items of the first item is selected; and control the display to display only one of the first area and the second area of the captured image at a second display magnification higher than the first display magnification in a case where the captured image is determined to be the dual-lens image and any one of the setting items of the second item is selected.

An aspect of the present invention is an information processing method including: acquiring a captured image; controlling a display to display a first item and a second item together with the captured image, each of the first item and the second item including a plurality of setting items; determining whether the captured image is a dual-lens image that includes a first area acquired by imaging through a first shooting lens and a second area acquired by imaging through a second shooting lens, the second area having a parallax with respect to the first area; controlling the display to display both the first area and the second area of the captured image at a first display magnification in a case where the captured image is determined to be the dual-lens image and any one of the setting items of the first item is selected; and controlling the display to display only one of the first area and the second area of the captured image at a second display magnification higher than the first display magnification in a case where the captured image is determined to be the dual-lens image and any one of the setting items of the second item is selected.

Further features of the present invention will become apparent from the following description of exemplary embodiments with reference to the attached drawings.

BRIEF DESCRIPTION OF THE DRAWINGS

FIGS. 11A and 11B are flowcharts illustrating setting change processing after a setting item is selected.

DESCRIPTION OF THE EMBODIMENTS

Figure 1A:
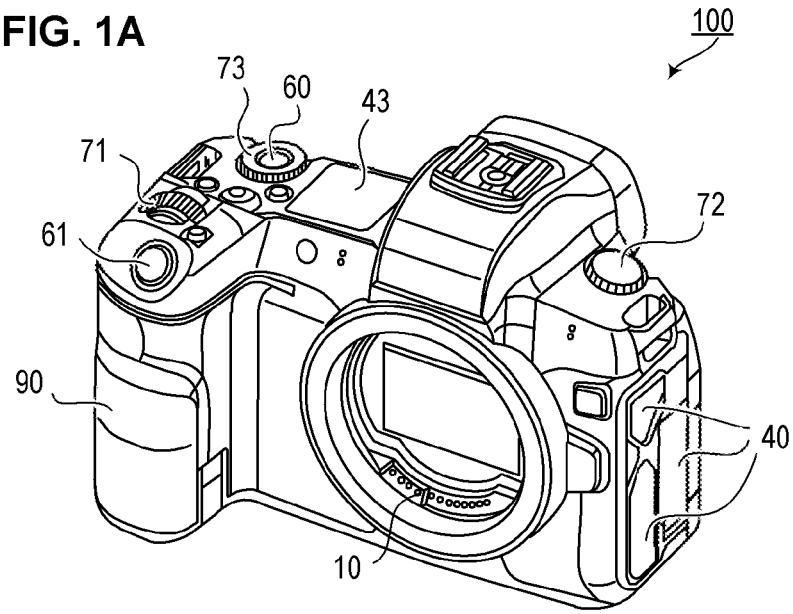
FIGS. 1A and 1B illustrate external views of a digital camera.

Hereinafter, a preferred embodiment of the present invention will be described with reference to the drawings. In the present embodiment, a case where an information processing apparatus (electronic apparatus) is a digital camera 100 (imaging apparatus) will be described as an example. However, the present embodiment can be applied to any information processing apparatus as long as the information processing apparatus (for example, a personal computer, a smartphone, or a server) is capable of executing at least a part of the processing of the digital camera 100.

The digital camera 100 can acquire an image (dual-lens image) in which a left image and a right image having a predetermined parallax therebetween in the lateral direction are arranged side by side and display the acquired image on a display unit. In addition, the digital camera 100 can apply predetermined image processing to a target range (processing target range) of the image displayed on the display unit. The predetermined image processing is, for example, enlargement processing. The digital camera 100 displays, on the display unit, an image (enlarged image) obtained by enlarging the target range in accordance with an enlargement instruction. In the present embodiment, the enlargement instruction is given by pressing an enlargement button 78 (a physical member that can be pressed). Alternatively, the enlargement instruction may be given by performing a pinch-in on a touch panel 70a, and the enlargement display may be cancelled by performing a pinch-out on the touch panel 70a. Note that the predetermined image processing is not limited to enlargement processing. For example, the predetermined image processing may be "processing for detecting a luminance distribution, a chromaticity distribution, or the like in the target range and generating a histogram or a waveform monitor" or "processing for applying filter processing such as contrast enhancement processing to the target range".

The digital camera 100 displays an item (display item) indicating the target range in the dual-lens image. The item is, for example, a frame-shaped indicator (marker) indicating the target range or a semi-transmissive color image superimposed on the target range. The digital camera 100 can change a display position of an item (that is, the target range indicated by the item) in accordance with a user operation. When the dual-lens image is displayed, the digital camera 100 displays the item at a position that does not extend over both the left image and the right image. That is, the target range is determined so as not to include both the left image and the right image. In other words, the target range (the range indicated by the item) is set so as to include only one of the left image and the right image.

Even when the digital camera 100 receives a user operation to change the display position of the item (the position of the target range), the digital camera 100 controls the display of the item such that the target range indicated by the item does not extend over both the left image and the right image.

Figure 1B:
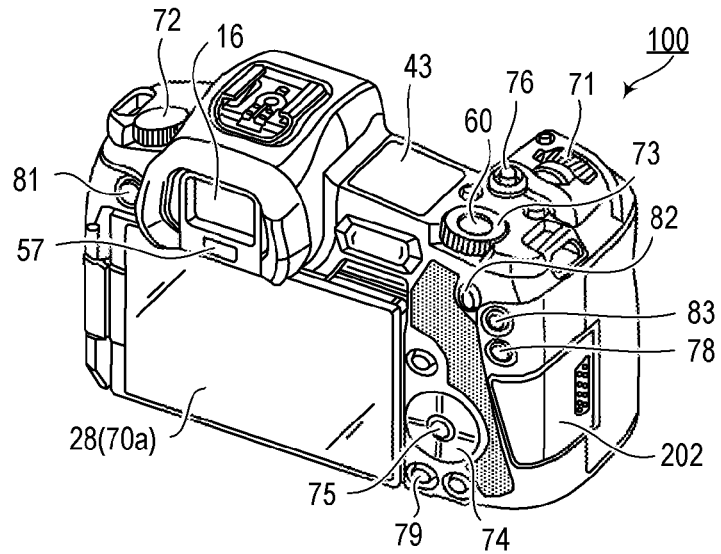

FIGS. 1A and 1B illustrate external views of the digital camera 100 as an example of an apparatus to which the present invention is applicable. FIG. 1A is a front perspective view of the digital camera 100, and FIG. 1B is a rear perspective view of the digital camera 100. In FIGS. 1A and 1B, a display unit 28 is a display unit (a display unit provided on the rear surface of the camera) that displays images and various kinds of information. The touch panel 70a is a touch detection unit capable of detecting a touch operation performed on the display surface (operation surface) of the display unit 28. An external-viewfinder display unit 43 is a display unit provided on a top surface of the camera and displays various setting values of the camera including a shutter speed and an aperture.

A shutter button 61 is an operation unit for giving a shooting instruction. A mode change switch 60 is an operation unit for switching various modes. Terminal covers 40 are covers that protect connectors (not illustrated) for connection cables (cables used for connecting external devices with the digital camera 100) or the like. A main electronic dial 71 is a rotary operation member included in an operation unit 70. A user can change the setting values such as a shutter speed and an aperture by rotating the main electronic dial 71. A power switch 72 is an operation member for switching the power of the digital camera 100 to ON or OFF.

A sub electronic dial 73 is a rotary operation member included in the operation unit 70. For example, the user can move a selection frame and scroll images by manipulating the sub electronic dial 73. A cross key 74 included in the operation unit 70 is a cross key (a four-directional key) capable of being individually pressed on up, down, left, and right portions thereof. The operation corresponding to a pressed portion of the cross key 74 can be performed. A SET button 75 is a push button included in the operation unit 70 and is mainly used for determining a selected item. A moving image button 76 is used for receiving instructions to start and stop moving image capturing (recording).

The enlargement button 78 is included in the operation unit 70 and serves as an operation button for switching an enlargement mode to ON or OFF during a live view display in a shooting mode. When the enlargement mode has been turned on, a LV image can be enlarged or reduced by manipulating the main electronic dial 71. In a playback mode, the enlargement button 78 functions as an enlargement button for enlarging a playback image and increasing the display magnification. A playback button 79 is included in the operation unit 70 and serves as an operation button for switching between the shooting mode and the playback mode. By pressing the playback button 79 during the shooting mode, the mode is shifted to the playback mode, and the latest image among the images recorded on a recording medium 200 can be displayed on the display unit 28.

A menu button 81 is included in the operation unit 70, and when the menu button 81 is pressed, various settable menus (menu screens) are displayed on the display unit 28. The user can intuitively perform various settings by using the cross key 74 and the SET button 75 while referring to the menu displayed on the display unit 28.

A multi-controller 82 can be tilted in any direction of 360 degrees to give key instructions corresponding to eight directions such as up, down, left, and right directions. The multi-controller 82 can also be pressed to activate an assigned function. A display-mode switching button 83 is an operation member for switching between a plurality of different display modes related to information about a live view image, shooting information display, and the like displayed on the display unit 28 or an EVF 29. Each time the display-mode switching button 83 is pressed, the display mode is switched. Thus, the user can visually recognize the information about the image being captured or the image being played back in the desired display mode. A communication terminal 10 is a communication terminal through which the digital camera 100 communicates with the lens unit (detachably attachable).

An eyepiece unit 16 is an eyepiece portion of an eyepiece viewfinder (look-through viewfinder). The user can visually recognize an image displayed on the internally provided EVF 29 through the eyepiece unit 16. An eye-proximity detection unit 57 is an eye-proximity detection sensor that detects whether the user's eye is in the proximity of the eyepiece unit 16. A lid 202 is a lid of a slot for accommodating the recording medium 200. A grip portion 90 is a holding portion having a shape that is easy for the user holding the digital camera 100 to grip by the right hand. The shutter button 61 and the main electronic dial 71 are disposed at positions operable with the user's right index finger in a state where the user holds the digital camera 100 by gripping the grip portion 90 with his or her right little finger, ring finger, and middle finger. The sub electronic dial 73 is disposed at a position operable with the right thumb in the same state.

Figure 2:
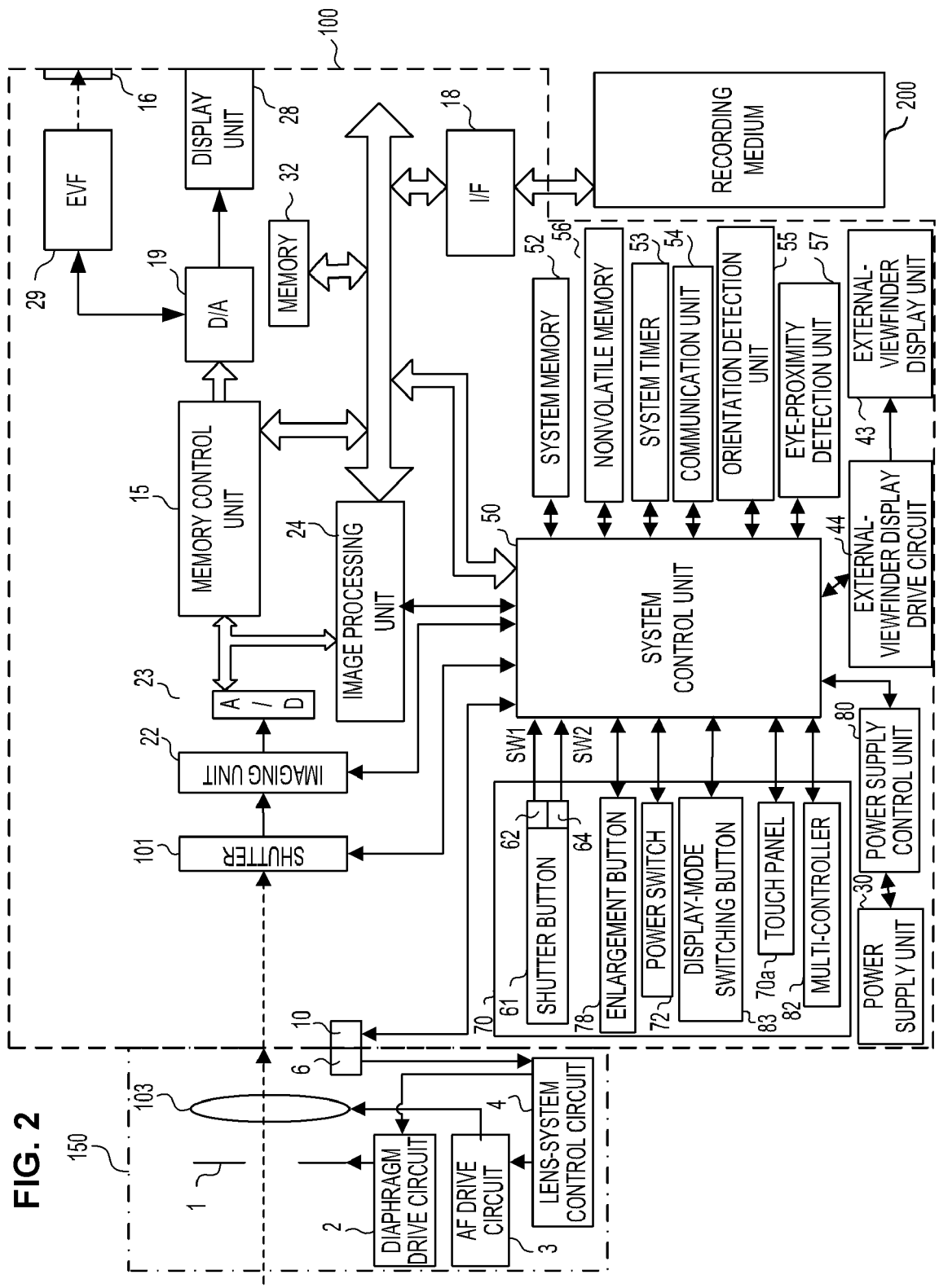
FIG. 2 illustrates a block diagram of the digital camera.

FIG. 2 is a block diagram illustrating a configuration example of the digital camera 100 according to the present embodiment. In FIG. 2, a lens unit 150 is an interchangeable lens unit on which a shooting lens is mounted. Although a lens 103 is usually composed of a plurality of lenses, only a single lens is illustrated in FIG. 2 for simplicity. A communication terminal 6 is a communication terminal through which the lens unit 150 communicates with the digital camera 100. The communication terminal 10 is a communication terminal through which the digital camera 100 communicates with the lens unit 150. The lens unit 150 communicates with a system control unit 50 via the communication terminals 6 and 10. The lens unit 150 uses a lens-system control circuit 4 provided therein to control a diaphragm 1 via a diaphragm drive circuit 2 and adjusts the focus by shifting the position of the lens 103 via an AF drive circuit 3. In addition, the digital camera 100 identifies the type of lens unit 150 attached to the digital camera 100 via the communication terminals 6 and 10.

A shutter 101 is a focal plane shutter that can freely control the exposure time of an imaging unit 22 under the control of the system control unit 50.

The imaging unit 22 is an imaging element including a CCD, a CMOS sensor, and the like for converting an optical image into an electric signal. The imaging unit 22 may include an imaging plane phase difference sensor that outputs defocus amount information to the system control unit 50. An A/D converter 23 converts an analog signal into a digital signal. The A/D converter 23 is used to convert an analog signal output from the imaging unit 22 into a digital signal.

An image processing unit 24 performs predetermined pixel interpolation, resizing processing (such as reduction), and color conversion processing on data (data from the A/D converter 23 or data from a memory control unit 15). In addition, the image processing unit 24 performs predetermined calculation processing by using captured image data. The system control unit 50 performs exposure control and ranging control based on the calculation result obtained by the image processing unit 24. On the basis of these controls, through-the-lens (TTL) AF processing, automatic exposure (AE) processing, and electronic flash (EF) (preliminary flash emission) processing are performed. The image processing unit 24 further performs predetermined calculation processing by using captured image data and performs TTL automatic white balance (AWB) processing based on the obtained calculation result. Data output from the A/D converter 23 is directly written into a memory 32 via the image processing unit 24 and the memory control unit 15 or via the memory control unit 15. The memory 32 stores the image data obtained by the imaging unit 22 and converted into digital data by the A/D converter 23 and image data to be displayed on the display unit 28 or the EVF 29. The memory 32 has a storage capacity sufficient to store a predetermined number of still images and a predetermined duration of moving images and audio data. The memory 32 also serves as a memory (video memory) for image display.

A D/A converter 19 converts image display data stored in the memory 32 into an analog signal and provides the analog signal to the display unit 28 or the EVF 29. Thus, the image display data written in the memory 32 is displayed on the display unit 28 or the EVF 29 via the D/A converter 19. The display unit 28 or the EVF 29 performs display corresponding to the analog signal from the D/A converter 19 on a display device such as a LCD or an EL display. Live view display (LV display) can be performed by converting digital signals (signals that have been A/D-converted once by the A/D converter 23 and stored in the memory 32) into analog signals by the D/A converter 19 and sequentially transferring the analog signals to the display unit 28 or the EVF 29 to be displayed. Hereinafter, the image displayed by the LV display is referred to as a live view image (LV image).

Various setting values of the camera including a shutter speed and an aperture are displayed on the external-viewfinder display unit 43 via an external-viewfinder display unit drive circuit 44.

A nonvolatile memory 56 is an electrically erasable and recordable memory, and an EEPROM is used as the nonvolatile memory 56, for example. The nonvolatile memory 56 stores operation constants of the system control unit 50, programs, etc. The programs refer to programs for executing processing of various flowcharts, which will be described below in the present embodiment.

The system control unit 50 is a control unit including at least one processor or circuit and controls the entire digital camera 100. The system control unit 50 implements various processes according to the present embodiment, which will be described below, by executing the above-described programs stored in the nonvolatile memory 56. For example, a RAM is used as a system memory 52, and operation constants of the system control unit 50, variables, the programs read from the nonvolatile memory 56, etc. are expanded in the system memory 52. The system control unit 50 also performs a display control operation by controlling the memory 32, the D/A converter 19, the display unit 28, etc.

A system timer 53 is a clock unit that measures time used for various control operations and the time of a built-in clock.

The operation unit 70 is an operation unit for inputting various operation instructions to the system control unit 50. The mode change switch 60 is an operation member included in the operation unit 70 and switches the operation mode of the system control unit 50 to any one of a still image shooting mode, a moving image shooting mode, a playback mode, etc. The still image shooting mode includes an automatic shooting mode, an automatic scene determination mode, a manual mode, an aperture priority mode (Av mode), a shutter speed priority mode (Tv mode), and a program AE mode (P mode). The still image shooting mode also includes various scene modes, which have shooting settings specific to respective shooting scenes, a custom mode, etc. The user can directly switch the mode to any one of these modes using the mode change switch 60. Alternatively, first, the user may switch the screen to a shooting-mode list screen by using the mode change switch 60, and then selects any one of a plurality of modes displayed on the list screen and switch the mode to the selected mode by using another operation member. Similarly, the moving image shooting mode may include a plurality of modes.

A first shutter switch 62 turns on when the shutter button 61 of the digital camera 100 is operated halfway, that is, the shutter button 61 is half-pressed (shooting preparation instruction), and generates a first shutter switch signal SW1. In response to the generation of the first shutter switch signal SW1, shooting preparation operations (AF processing, AE processing, AWB processing, EF processing, etc.) are started.

A second shutter switch 64 turns on when the operation of the shutter button 61 is completed, that is, the shutter button 61 is fully pressed (shooting instruction), and generates a second shutter switch signal SW2. In response to the generation of the second shutter switch signal SW2, the system control unit 50 starts a series of shooting processing operations (processing from reading of a signal from the imaging unit 22 to writing of a captured image to the recording medium 200 as an image file).

The operation unit 70 serves as various operation members (reception units) as input units for receiving operations from the user. The operation unit 70 includes at least the following operation members: the shutter button 61; the main electronic dial 71; the power switch 72; the sub electronic dial 73; the cross key 74; the SET button 75; the moving image button 76; an AF lock button 77; the enlargement button 78; the playback button 79; the menu button 81; and the multi-controller 82.

A power supply control unit 80 includes a battery detection circuit, a direct current-to-direct current (DC-DC) converter, a switch circuit (circuit for switching blocks to be energized), etc. The power supply control unit 80 detects presence or absence of a battery attached, the type of battery, and a remaining battery level. In addition, the power supply control unit 80 controls the DC-DC converter based on the obtained detection results and instructions from the system control unit 50 and supplies a necessary voltage to each unit including the recording medium 200 for a necessary period. A power supply unit 30 includes a primary battery (such as an alkali battery or a lithium battery), a secondary battery (such as a NiCd battery, a NiMH battery, a Li battery, or the like), an AC adapter, and the like.

A recording medium I/F 18 is an interface with the recording medium 200 such as a memory card and a hard disk. The recording medium 200 is a recording medium such as a memory card for recording captured images. The recording medium 200 includes a semiconductor memory, a magnetic disk, or the like.

A communication unit 54 is connected to an external device wirelessly or via a wired cable and transmits and receives video signals and audio signals. The communication unit 54 can also be connected to a wireless local area network (LAN) or the Internet. The communication unit 54 is also capable of communicating with an external device using Bluetooth (registered trademark) or Bluetooth Low Energy. The communication unit 54 can transmit images (including LV images) captured by the imaging unit 22 and images recorded on the recording medium 200. Further, the communication unit 54 can receive images and other various kinds of information from an external device.

An orientation detection unit 55 detects the orientation of the digital camera 100 with respect to the direction of gravity. On the basis of the orientation detected by the orientation detection unit 55, it is possible to determine whether the image captured by the imaging unit 22 is an image captured with the digital camera 100 held horizontally or vertically. The system control unit 50 can add orientation information corresponding to the orientation detected by the orientation detection unit 55 to an image file of the image captured by the imaging unit 22 or rotate the image and record the rotated image. An acceleration sensor, a gyro sensor, or the like can be used as the orientation detection unit 55. The motion of the digital camera 100 (such as panning, tilting, lifting-up, and stationary) is detectable by using the acceleration sensor or the gyro sensor serving as the orientation detection unit 55.

The eye-proximity detection unit 57 is an eye-proximity detection sensor that detects (performs proximity detection on) an approach (eye proximity) and withdrawal (eye separation) of an eye (object) to and from the eyepiece unit 16 of the viewfinder. The system control unit 50 switches between display (a display state) and non-display (a non-display state) of the display unit 28 and the EVF 29 based on a state detected by the eye-proximity detection unit 57. More specifically, when the digital camera 100 is at least in a shooting standby state and the display destination switching is set to automatic switching, while the approach of the eye is not detected, the display unit 28 is set as a display destination and its display is turned on, and the display of the EVF 29 is turned off. Whereas, while the approach of the eye is detected, the EVF 29 is set as a display destination and its display is turned on, and the display of the display unit 28 is turned off.

The eye-proximity detection unit 57 includes, for example, an infrared proximity sensor. The eye-proximity detection unit 57 can detect an approach of any object to the eyepiece unit 16 of the viewfinder including the built-in EVF 29. When an object approaches, infrared light emitted from a light emitting unit (not illustrated) of the eye-proximity detection unit 57 is reflected by the object and received by a light receiving unit (not illustrated) of the infrared proximity sensor. On the basis of the amount of received infrared light, how close the object is from the eyepiece unit 16 (eye proximity distance) can also be determined. In this way, the eye-proximity detection unit 57 performs eyepiece detection for detecting the proximity distance of the object with respect to the eyepiece unit 16. When an object shifting from a non-eye proximity state (non-approach state) and approaching to be in a predetermined distance or less to the eyepiece unit 16 is detected, the eye-proximity detection unit 57 determines that the object is in an eye proximity state. When the object detected to be in the eye proximity state shifts from the eye proximity state (approach state) and moves away by a predetermined distance or more from the eyepiece unit 16, the eye-proximity detection unit 57 determines that the object is in an eye separation state. The threshold for detecting the eye proximity and the threshold for detecting the eye separation may be different from each other by having hysteresis, for example. After the eye proximity has been detected, the eye proximity state is assumed to continue until the eye separation is detected. After the eye separation has been detected, the non-eye proximity state is assumed to continue until the eye proximity is detected. Note that the use of the infrared proximity sensor is merely an example, and other sensors capable of detecting an approach of an eye or an object that can be regarded as the eye proximity may be used as the eye-proximity detection unit 57.

The touch panel 70a and the display unit 28 may be integrally configured. For example, the touch panel 70a is mounted on an upper layer of the display surface of the display unit 28 and configured such that the optical transmittance thereof does not interfere with the display on the display unit 28. Input coordinates of the touch panel 70a are associated with display coordinates on the display surface of the display unit 28. This can provide a graphical user interface (GUI) that enables the user to perform operations as if the user directly operates the screen displayed on the display unit 28.

The system control unit 50 can detect the following operations or states of the touch panel 70a.

- A finger or a pen not touching the touch panel 70a newly touches the touch panel 70a. That is, a touch is started (hereinafter, referred to as a "touch-down").
- A state in which a finger or a pen is touching the touch panel 70a (hereinafter, referred to as a "touch-on").
- A finger or a pen touching the touch panel 70a moves (hereinafter, referred to as a "touch-move").
- A finger or a pen touching the touch panel 70a is released. That is, a touch is ended (hereinafter, referred to as a "touch-up").
- A state in which the touch panel 70a is not touched by anything (hereinafter, referred to as a "touch-off").

When a touch-down is detected, a touch-on is simultaneously detected. After a touch-down, a touch-on normally continues to be detected unless a touch-up is detected. A touch-move is detected while a touch-on is being detected. Even when a touch-on is detected, a touch-move is not detected if the touch position is not moved. After touch-ups of all fingers or pens touching the touch panel 70a are detected, a touch-off is detected.

These operations and states and the position coordinates of a finger or a pen touching the touch panel 70a are notified to the system control unit 50 via an internal bus, and the system control unit 50 determines the operations (touch operations) that have been performed on the touch panel 70a based on the notification information. Regarding a touch-move, a moving direction of a finger or a pen moving on the touch panel 70a can also be determined for each of the vertical component and the horizontal component on the touch panel 70a based on a change in the position coordinates.

When a touch-move for a predetermined distance or more is detected, the system control unit 50 determines that a slide operation has been performed. An operation of quickly moving a finger touching the touch panel for a certain distance and releasing the finger from the touch panel is referred to as a flick. In other words, a flick is an operation of quickly moving a finger over the touch panel 70a as if flicking the touch panel 70a. When a touch-move is detected for a predetermined distance or more at a predetermined speed or higher and a touch-up is detected immediately thereafter, the system control unit 50 determines that a flick has been performed (it can be determined that a flick has been performed following a slide operation).

Furthermore, a touch operation of touching a plurality of positions (for example, two points) together (performing a multi-touch) and bringing the touched positions closer to each other will be referred to as a pinch-in. A touch operation of separating the touched positions away from each other will be referred to as a pinch-out. The pinch-out and the pinch-in are collectively referred to as a pinch operation (or simply a pinch). The touch panel 70a may be a touch panel using any one of various methods including a resistive method, capacitive method, surface-elastic-wave method, infrared method, electromagnetic induction method, image-recognition method, and optical sensor method. Some methods detect a touch based on a contact with the touch panel, and some methods detect a touch based on an approach of a finger or a pen to the touch panel, and any method may be used.

Figure 3:
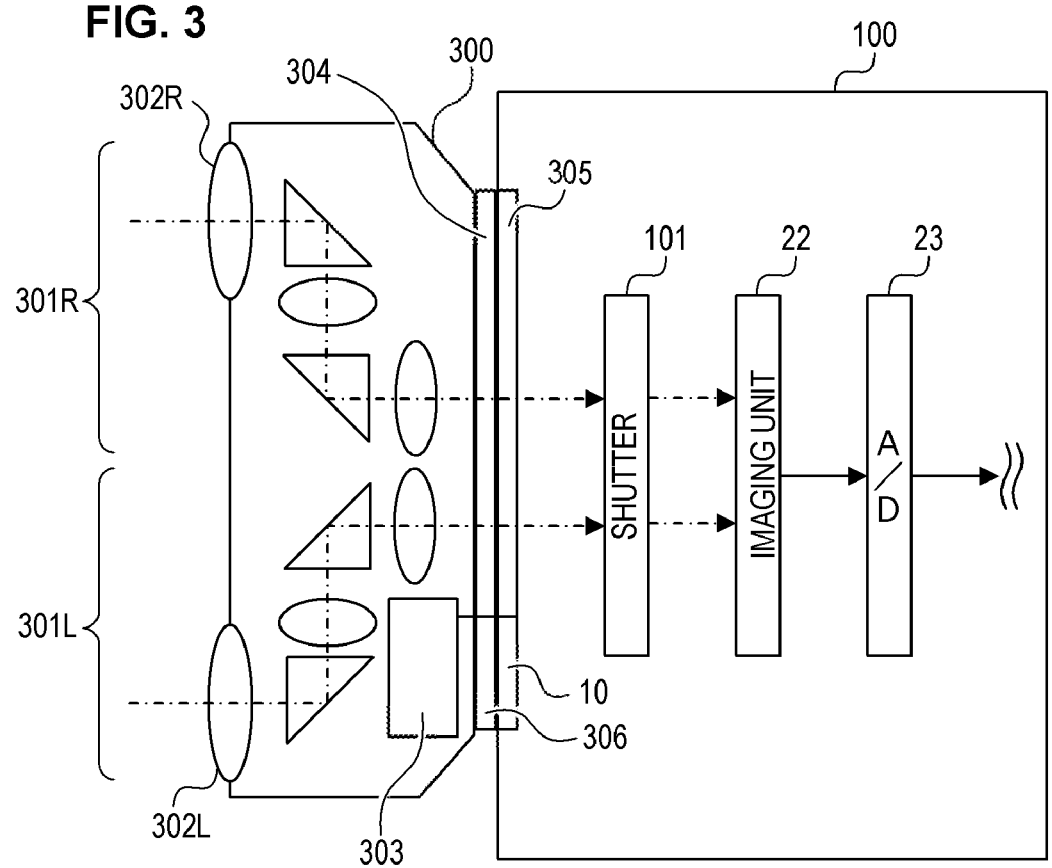
FIG. 3 is a schematic diagram illustrating a configuration of a lens unit.

FIG. 3 is a schematic diagram illustrating an example of a configuration of a lens unit 300. FIG. 3 illustrates a state in which the lens unit 300 is attached to the digital camera 100. In the digital camera 100 illustrated in FIG. 3, the same components as those described with reference to FIG. 2 are denoted by the same reference numerals, and description thereof will be omitted as appropriate.

The lens unit 300 is a type of interchangeable lens detachably attachable to the digital camera 100. The lens unit 300 is a dual-lens unit capable of obtaining an optical image in which a left image and a right image have a parallax. The lens unit 300 includes two optical systems (shooting lenses), each of which has a wide view angle of 180 degrees and can capture an image having a range of a front hemisphere. Specifically, the two optical systems of the lens unit 300 can each input an optical image of a subject having in a field of view (angle of view) of 180 degrees in the lateral direction (horizontal angle, azimuth angle, or yaw angle) and 180 degrees in the vertical direction (vertical angle, elevation and depression angle, or pitch angle).

The lens unit 300 includes a right-eye optical system 301R (an optical system including a plurality of lenses, reflection minors, etc.), a left-eye optical system 301L (an optical system including a plurality of lenses, reflection minors, etc.), and a lens-system control circuit 303. The right-eye optical system 301R corresponds to an example of a first optical system, and the left-eye optical system 301L corresponds to an example of a second optical system. The right-eye optical system 301R and the left-eye optical system 301L include a lens 302R and a lens 302L, respectively, which are disposed on the subject side. The lens 302R and the lens 302L are oriented in the same direction and have optical axes parallel to each other. Each of the optical systems is a fisheye lens and forms a circular optical image on the imaging unit 22 (sensor). The optical image (left image) input through the left-eye optical system 301L and the optical image (right image) input through the right-eye optical system 301R are formed on an imaging surface of the single imaging unit 22. Thus, the imaging unit 22 acquires an image that includes both the left-eye and right-eye optical images.

The lens unit 300 according to the present embodiment is a VR 180 lens (dual-lens unit) for obtaining an image of VR180 (a VR-image format for dual-lens stereoscopic viewing). Each of the right-eye optical system 301R and the left-eye optical system 301L of the VR180 lens includes a fisheye lens capable of capturing an image having a range of 180 degrees. As the VR180 lens, lenses each of which is capable of capturing a wide view angle of approximately 160 degrees, which is narrower than the range of 180 degree, can also be used as long as each of the right-eye optical system 301R and the left-eye optical system 301L of the VR180 lens can capture an image that can be used for a dual-lens VR display as VR180. The VR180 lens can form a right image (first image) formed through the right-eye optical system 301R and a left image (second image) formed through the left-eye optical system 301L, the left image having a parallax with respect to the right image, on one or two imaging elements of the attached camera. In the digital camera 100 according to the present embodiment, a right image and a left image are formed on a single imaging element (sensor), and a single image (a dual-lens image) in which an image corresponding to the right image (an image area of the right image) and an image corresponding to the left image (an image area of the left image) are arranged side by side is generated. This dual-lens image includes the image area of the right image, the image area of the left image, and an area (black portion) in which no optical image is formed.

The lens unit 300 is attached to the digital camera 100 via a lens mount unit 304 and a camera mount unit 305 of the digital camera 100. Thus, the system control unit 50 of the digital camera 100 and the lens-system control circuit 303 of the lens unit 300 are electrically connected to each other via the communication terminal 10 of the digital camera 100 and a communication terminal 306 of the lens unit 300.

In the present embodiment, a right image formed through the right-eye optical system 301R and a left image formed through the left-eye optical system 301L having a parallax with respect to the right image are formed side by side on the imaging unit 22 of the digital camera 100. In other words, two optical images formed by the right-eye optical system 301R and the left-eye optical system 301L are formed on a single imaging element. The imaging unit 22 converts the formed subject image (optical signal) into an analog electric signal to obtain image data of a dual-lens image. By using the lens unit 300, two images having a parallax therebetween can be simultaneously obtained (as a set) from two positions (optical systems), that is, the right-eye optical system 301R and the left-eye optical system 301L. In addition, by separately VR-displaying the obtained images as a left-eye image and a right-eye image, the user can view a stereoscopic VR image (VR180) having a range of 180 degrees.

With a conventional ordinary single-lens unit, an image incident on the lens is symmetrically inverted about a point of the optical axis center and input to the sensor. An imaging apparatus such as the digital camera 100 generates an image that does not cause a feeling of strangeness (that is, an image not inverted) by reading the sensor, performing inversion processing on the read image, or the like. With the dual-lens unit, the image is symmetrically inverted vertically but not laterally and input to the sensor, and the image acquired through the left-eye optical system is input to the sensor on the left side, and the image acquired through the right-eye optical system is input to the sensor on the right side. Therefore, when the conventional inversion processing is performed on such an image, the left and right of the inverted image become reverse to the left and right with respect to the digital camera 100, that is, the image acquired through the left-eye optical system is displayed on the right side, and the image acquired through the right-eye optical system is displayed on the left side.

A VR image refers to an image that can be VR-displayed, which will be described below. Examples of the VR image include an omnidirectional image (spherical image) captured by an omnidirectional camera (spherical camera) and a panoramic image having a video range (effective video range) wider than a display range that can be displayed on the display unit at a time. The VR image is not limited to a still image and may also include a moving image and a live image (an image obtained from a camera almost in real time). The VR image has a video range (effective video range) corresponding to a field of view up to 360 degrees in the lateral direction and 360 degrees in the vertical direction. Even if the video range is less than 360 degrees in the lateral direction and less than 360 degrees in the vertical direction, the VR image also includes an image having an angle of view wider than an angle of view that can be captured by an ordinary camera or an image having a video range wider than a display range that can be displayed on the display unit at a time. An image captured by the digital camera 100 using the lens unit 300 described above is a type of VR image. The VR image can be VR-displayed, for example, by setting the display mode of a display device (a display device capable of displaying a VR image) to a "VR view". By having a VR image having an angle of view of 360 degrees VR-displayed and changing the orientation of the display device in the lateral direction (horizontal rotation direction), the user can view a seamless omnidirectional image in the lateral direction.

A VR display (VR view) refers to a display method (display mode) capable of changing the display range of the VR image so as to display the image having a field of view corresponding to the orientation of the display device. The VR display includes a "single-lens VR display (single-lens VR view)" in which a single image is displayed by transforming (transforming while performing distortion correction) an VR image to perform mapping onto a virtual sphere. The VR display also includes a "dual-lens VR display (dual-lens VR view)" in which a VR image for a left eye and a VR image for a right eye are displayed in a left area and a right area, respectively, side by side by individually transforming the VR images to perform mapping onto respective virtual spheres. A stereoscopic view can be achieved by performing the "dual-lens VR display" using the left-eye VR image and the right-eye VR image having a parallax therebetween.

In any VR display, for example, when the user wears a display device such as a head-mounted display (HMD), an image having a field of view corresponding to the orientation of the user's face is displayed. For example, assuming that an image, of a VR image, having a field of view centered at 0 degrees in the lateral direction (a specific azimuth, for example, the north) and 90 degrees in the vertical direction (90 degrees from the zenith, that is, horizontal) is being displayed at a certain point in time, when the orientation of the display device is reversed from this state (for example, the display surface is turned from the south-facing orientation to the north-facing orientation), the display range is changed to an image, of the same VR image, having a field of view centered at 180 degrees in the lateral direction (an opposite azimuth, for example, the south) and 90 degrees in the vertical direction. That is, when the user wearing the HMD turns his or her face from the north to the south (that is, turns back), the image displayed on the HMD is also changed from the image of the north to the image of the south.

The VR image captured by using the lens unit 300 according to present embodiment is a VR180 image having a range of 180 degrees in front. Therefore, this VR image does not include an image having a range of 180 degrees behind. In a state where such a VR180 image is being displayed, when the orientation of the display device is changed to the side where no image exists, a blank area is displayed.

By performing the VR display of the VR image, the user visually feels as if he or she is in the VR image (inside the VR space). The method for displaying the VR image is not limited to the method in which the orientation of the display device is changed. For example, the display range may be moved (scrolled) in response to a user operation via a touch panel, a direction button, or the like. Further, during a VR display (during the display mode "VR view"), the display range may be changed in response to a specific operation (a touch-move performed on the touch panel, a drag operation performed with a mouse or the like, pressing of the direction button, etc.) in addition to a change of the display range by a change in orientation. Note that a smartphone attached to VR goggles (a head-mounted adapter) is a type of HMD.

In the digital camera 100, a dual-lens image captured through the lens unit 300 includes an image area of a right image input to the imaging unit 22 through the right-eye optical system and an image area of a left image input to the imaging unit 22 through the left-eye optical system. The user who uses the digital camera 100 may enlarge and display a part of an image (a live view image or a recorded image) in order to check for details of the part. When an image is enlarged by a common digital camera, the center position of enlargement may be consistently set at the center position of the entire image.

On the other hand, in order to check for details of a portion of the dual-lens image, it is desirable that only a part of the image area of the right image or only a part of the image area of the left image be displayed. However, when the image is enlarged, if the center position of enlargement is consistently set at the center (center portion) of the entire image, both the image area of the right image and the image area of the left image are included in the enlarged image. As a result, the user would find it difficult to intuitively identify which part of the original image is displayed as the enlarged image. Specifically, in the enlarged image, a left end portion of the original image area of the right image is displayed on the right side, and a right end portion of the original image area of the left image is displayed on the left side. Thus, the enlarged image having a lateral positional relationship different from the actual positional relationship of the subject is displayed.

With this in view, hereinafter, the digital camera 100 that performs live view enlargement processing suitable for a case where the image capturing is performed with a dual-lens unit such as the lens unit 300 will be described.

Live View Image

Display of live view images (LV images) on the display unit 28 will be described with reference to FIGS. 4 to 9. These LV images are acquired by image capturing performed by the digital camera 100 to which a dual-lens unit is attached.

Figure 4:
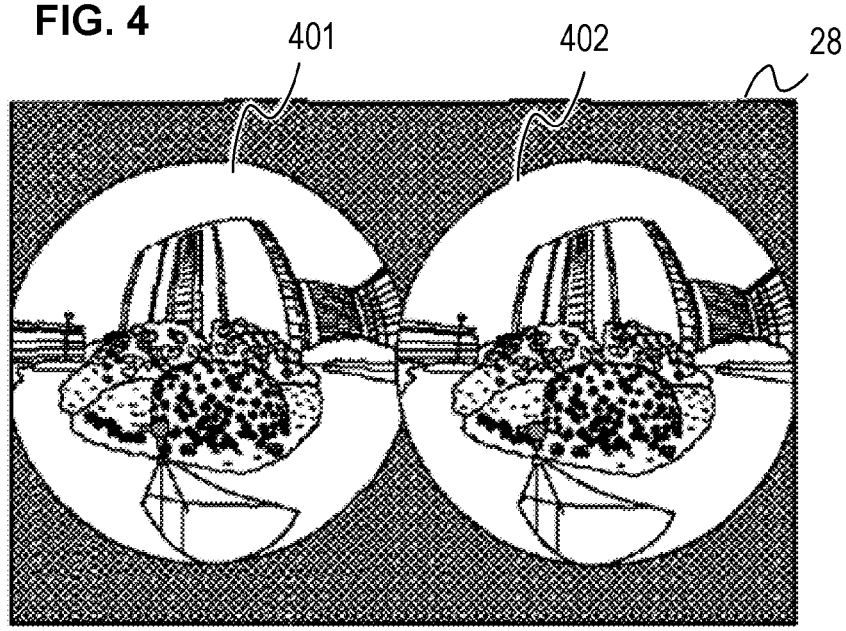
FIG. 4 is a diagram illustrating an LV image displayed at a magnification of 1×.

FIG. 4 illustrates a display example of an LV image (captured image) displayed at a display magnification of 1× (that is, a standard angle of view; not enlarged). The display unit 28 displays an LV image including an image area 401 captured through the right-eye optical system 301R and an image area 402 captured through the left-eye optical system 301L.

Figure 5:
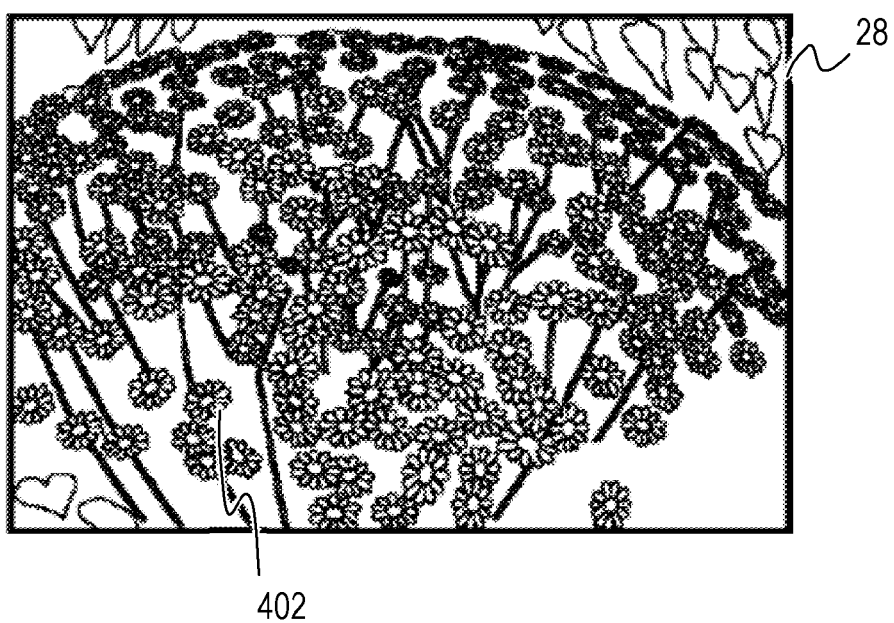
FIG. 5 is a diagram illustrating an LV image enlarged and displayed.

FIG. 5 illustrates a display example of an LV image obtained after a display-mode switching button 83 of the digital camera 100 to which a dual-lens unit is attached is pressed. The display unit 28 displays an enlarged image of a part of the image area 402 (image area on the right side in FIG. 4) of the LV image. That is, FIG. 5 illustrates an image obtained by enlarging the LV image by a display magnification higher than a magnification of 1× illustrated in FIG. 4. In FIG. 5, since only one of the two image areas is displayed, the image is displayed at a display magnification higher than twice the magnification of 1×. That is, the subject is displayed such that the vertical length and the horizontal length of the subject are more than twice the respective lengths in the case where the subject is displayed at a magnification of 1×.

Figure 6:
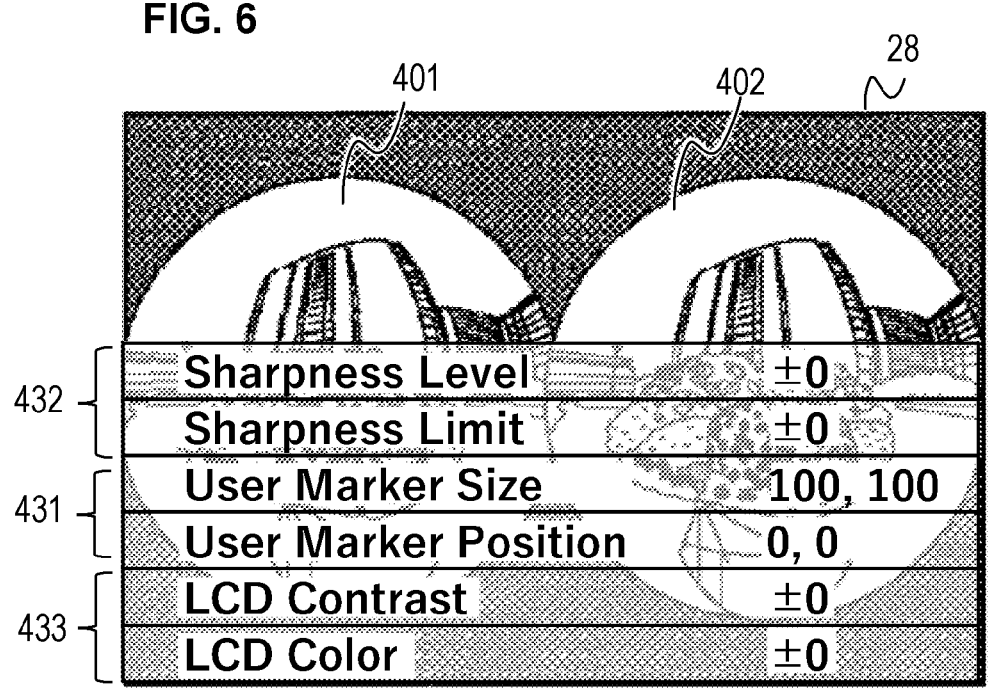
FIG. 6 is a diagram illustrating a menu displayed on an LV image.

FIG. 6 illustrates a display example of a menu displayed on the display unit 28. This menu is displayed after the menu button 81 is pressed while the dual-lens unit is attached to the digital camera 100 and the LV image at the standard angle of view (reference angle of view) as illustrated in FIG. 4 is displayed on the display unit 28. The menu includes a first item group 431, a second item group 432, and a third item group 433. Each of the first item group 431, second item group 432, and third item group 433 includes a plurality of setting items.

The first item group 431 includes, for example, setting items of an assist function (assist function for the angle of view) for indicating a specific position in a captured image (angle of view). The setting items of the assist function include a setting item for determining a size (user marker size) of a marker (display item; frame) specified by the user, a setting item for determining a position (user marker position) of the marker specified by the user, and the like. The first item group 431 may include, for example, a setting item for changing the brightness of the display surface of the display unit 28. This is because the user can set the brightness of the display surface of the display unit 28 more appropriately while viewing the entire LV image. The first item group 431 may include, for example, a setting item for mirror-reversed display on the screen. As described above, the first item group 431 includes various setting items that allow the user to easily perform appropriate setting by viewing the entire LV image.

The second item group 432 includes setting items related to a setting of image processing at image capturing. Specifically, the second item group 432 includes setting items for determining an image processing method (method for adjusting color, sharpness, and knee) performed on a captured image to be recorded. The second item group 432 includes, for example, other various setting items that allow the user to easily perform appropriate setting by viewing an enlarged LV image.

The third item group 433 includes setting items related to the setting (display method) of the display unit 28 (for example, setting items of contrast setting or color setting for the display surface of the display unit 28). The third item group 433 further includes, for example, a setting item that may be easier to set when the LV image is enlarged and a setting item that may be easier to set when the LV image is not enlarged, depending on the situation.

Figure 7:
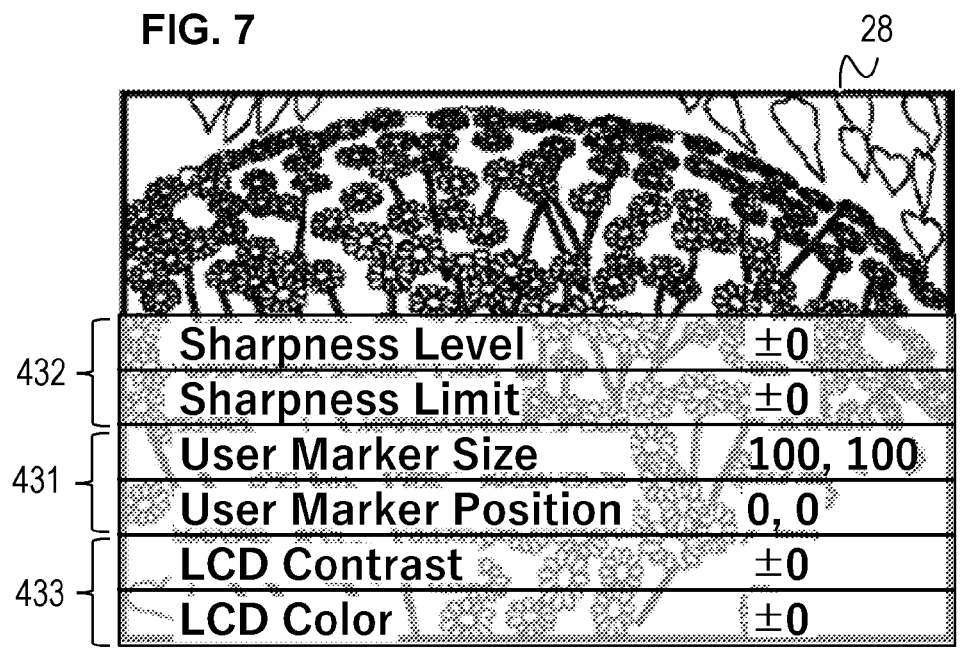
FIG. 7 is a diagram illustrating a menu displayed on an LV image.

FIG. 7 illustrates a display example of a menu displayed on the display unit 28. This menu is displayed when the enlarged LV image as illustrated in FIG. 5 is displayed on the display unit 28 and the menu button 81 of the digital camera 100 to which the dual-lens unit is attached is pressed. Similarly to the menu illustrated in FIG. 6, the menu illustrated in FIG. 7 also includes the first item group 431, the second item group 432, and the third item group 433.

Figure 8:
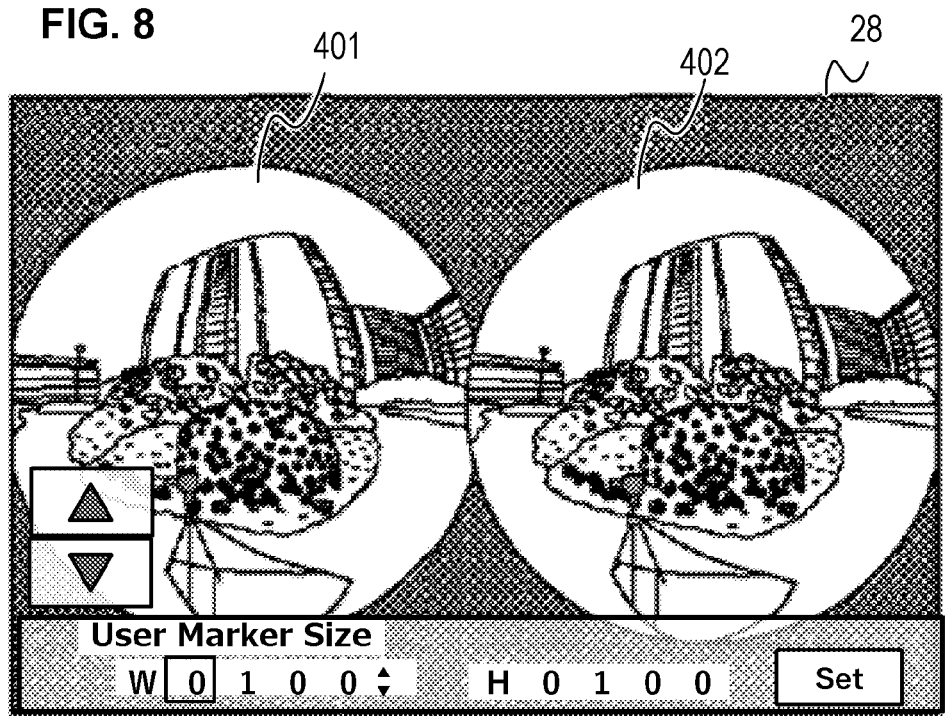
FIG. 8 is a diagram illustrating an example of a setting change screen.

FIG. 8 is an example of a setting change screen displayed on the display unit 28 when the setting item of the first item group 431 is selected. On the setting change screen illustrated in FIG. 8, the size (vertical and horizontal size) of the user marker (rectangular frame) to be superimposed on the LV image (display surface of the display unit 28) can be set.

Figure 9:
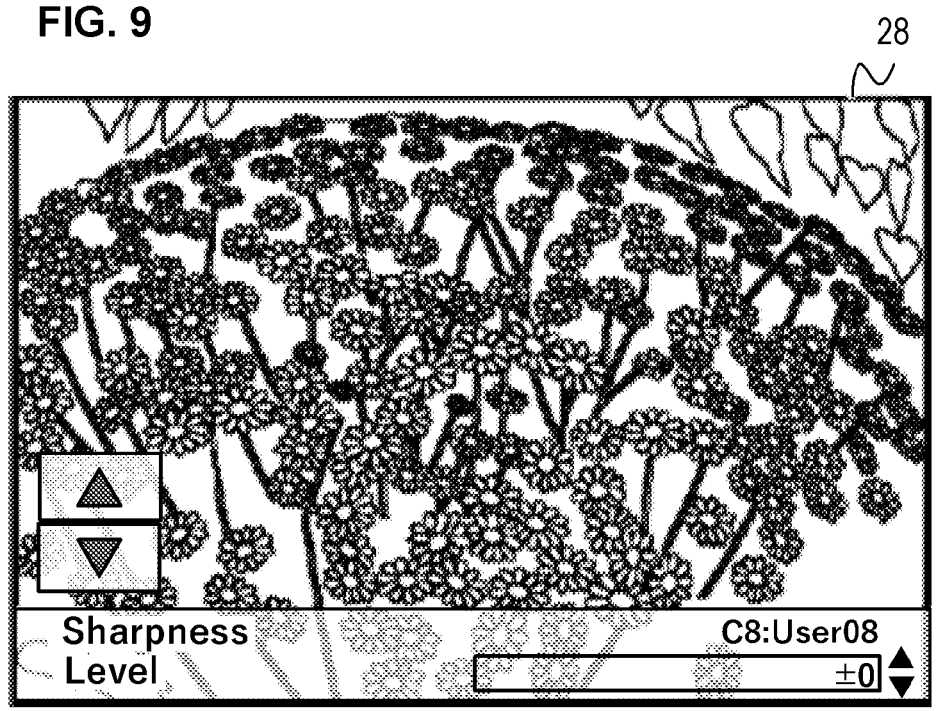
FIG. 9 is a diagram illustrating an example of a setting change screen.

FIG. 9 is an example of a setting change screen displayed on the display unit 28 when the setting item of the second item group 432 is selected. On the setting change screen illustrated in FIG. 9, a degree of emphasis (sharpness level) in image processing for emphasizing the outline of the LV image can be set.

Processing in Shooting Mode

Figure 10:
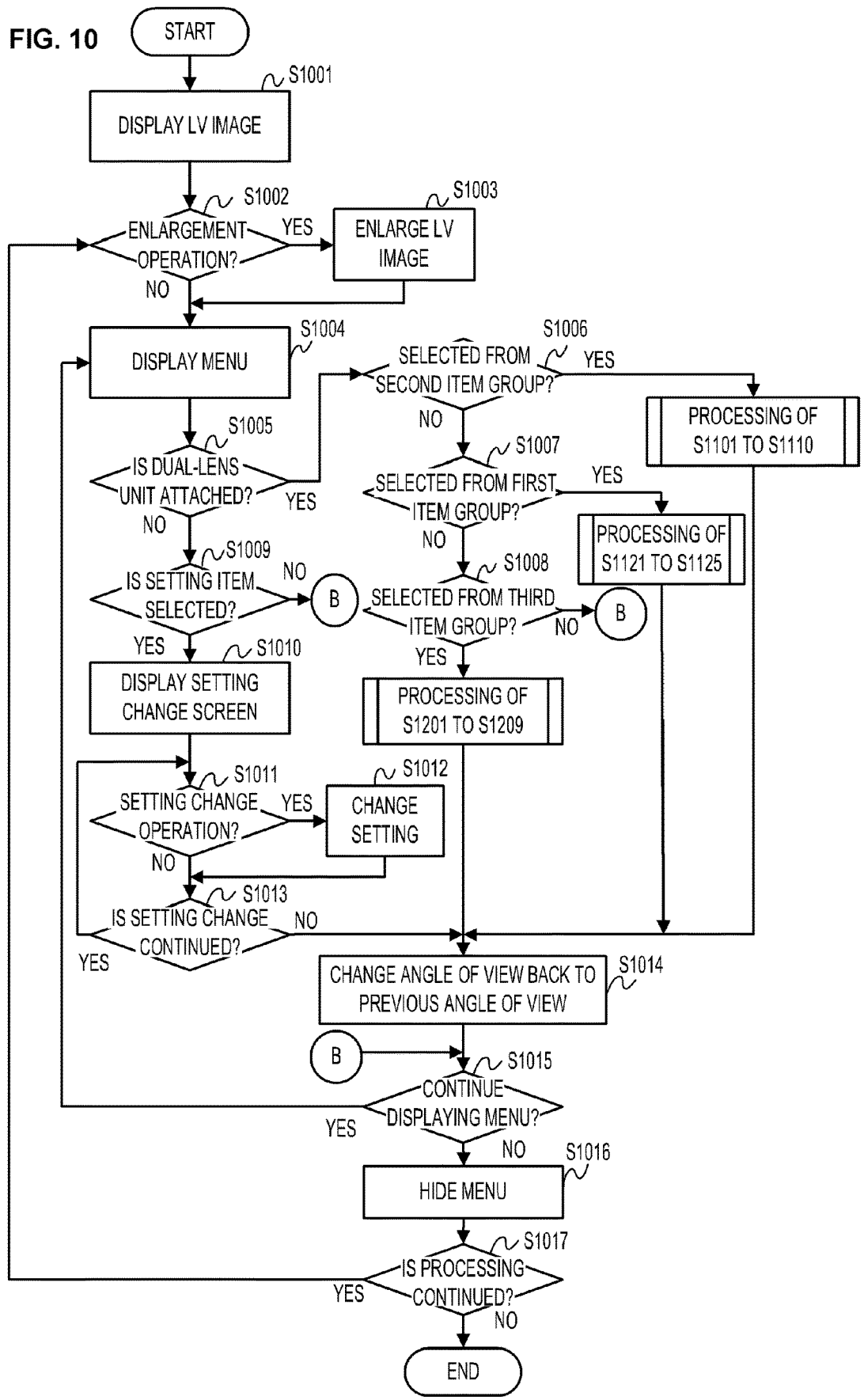
FIG. 10 is a flowchart illustrating processing in a shooting mode.

An example of processing in the shooting mode of the digital camera 100 will be described with reference to a flowchart in FIG. 10. The processing of the flowchart in FIG. 10 starts when the power of the digital camera 100 is turned on and the digital camera 100 is in a shooting standby state.

In step S1001, the system control unit 50 displays a live view image (LV image) on the display unit 28 at a magnification of 1× (so that the entire LV image is displayed on the entire display surface of the display unit 28) (see FIG. 4).

In step S1002, the system control unit 50 determines whether the display-mode switching button 83 has been pressed (an enlargement operation has been performed) in a state where the LV image is displayed on the display unit 28. If the system control unit 50 determines that the display-mode switching button 83 has been pressed, the processing proceeds to step S1003. If the system control unit 50 determines that the display-mode switching button 83 has not been pressed, the processing proceeds to step S1004.

In step S1003, as illustrated in FIG. 5, the system control unit 50 moves the LV image enlarged at a predetermined display magnification (a display magnification higher than a magnification of 1×) such that a predetermined position on the LV image is positioned at the center of the display surface of the display unit 28, and then displays the moved LV image on the display unit 28. The predetermined display magnification and the predetermined position are set in advance such that only one of the image area of the right image and the image area of the left image of the LV image is displayed on the display unit 28. Therefore, the predetermined display magnification is a display magnification higher than twice the magnification of 1×.

In step S1004, the system control unit 50 displays the menu (the first item group, the second item group, and the third item group) on the display unit 28, the menu being superimposed on the LV image.

In step S1005, the system control unit 50 communicates with the lens unit (attached lens unit) attached to the digital camera 100 via the communication terminals 6 and 10 so as to determine whether the lens unit is a dual-lens unit. If the system control unit 50 determines that the attached lens unit is a dual-lens unit, the processing proceeds to step S1006. If the system control unit 50 determines that the attached lens unit is not a dual-lens unit, processing proceeds to step S1009.

Alternatively, in step S1005, the system control unit 50 may determine whether the LV image is an image (dual-lens image) including both the image area of the right image and the image area of the left image. If the system control unit 50 determines that the LV image is a dual-lens image, the processing proceeds to step S1006. If the system control unit 50 determines that the LV image is not a dual-lens image, the processing proceeds to step S1009.

In step S1006, the system control unit 50 determines whether one setting item is selected from the second item group (second item). If the system control unit 50 determines that one setting item is selected from the second item group, the processing proceeds to step S1101 (see FIG. 11A). If the system control unit 50 determines that one setting item is not selected from the second item group, the processing proceeds to step S1007.

In step S1007, the system control unit 50 determines whether one setting item is selected from the first item group (first item). If the system control unit 50 determines that one setting item is selected from the first item group, the processing proceeds to step S1121 (see FIG. 11B). If the system control unit 50 determines that one setting item is not selected from the first item group, the processing proceeds to step S1008.

In step S1008, the system control unit 50 determines whether one setting item is selected from the third item group (third item). If the system control unit 50 determines that one setting item is selected from the third item group, the processing proceeds to step S1201 (see FIG. 12). If the system control unit 50 determines that one setting item is not selected from the third item group, the processing proceeds to step S1015.

In step S1009, the system control unit 50 determines whether one setting item is selected from the menu. If the system control unit 50 determines that one setting item is selected, the processing proceeds to step S1010. If the system control unit 50 determines that one setting item is not selected, the processing proceeds to step S1015. The one setting item described here may be any one of the setting items of the first item group, the second item group, and the third item group.

In step S1010, the system control unit 50 displays a screen (setting change screen) for changing the setting corresponding to the selected setting item on the display unit 28. The system control unit 50 continues to display the LV image maintaining the state immediately before the selecting of the setting item (that is, the display magnification is not changed).

In step S1011, the system control unit 50 determines whether a setting change operation has been performed. If the system control unit 50 determines that the setting change operation has been performed, the processing proceeds to step S1012. If the system control unit 50 determines that the setting change operation has not been performed, the processing proceeds to step S1013.

In step S1012, the system control unit 50 changes the setting (setting value) in accordance with the setting change operation.

In step S1013, the system control unit 50 determines whether the change of a setting (setting value) is continued. If the system control unit 50 determines that the setting change is continued, the processing proceeds to step S1011. If the system control unit 50 determines that the setting change is not continued (for example, if a specific button such as the menu button 81 is pressed), the processing proceeds to step S1014.

In step S1014, the system control unit 50 changes the angle of view back to the angle of view used before the selecting of the setting item (the angle of view used at the end of the processing in step S1005) and displays the LV image having the changed angle of view on the display unit 28. That is, in step S1014, the LV image having the range displayed before the selecting of the setting item is displayed at the display magnification used before the selection of the setting. In addition, the system control unit 50 switches from the display of the setting change screen to the display of the LV image and the menu.

In step S1015, the system control unit 50 determines whether to continue displaying the menu. If the system control unit 50 determines to continue displaying the menu, the processing proceeds to step S1004. If the system control unit 50 determines not to continue displaying the menu (for example, if a specific button is pressed), the processing proceeds to step S1016.

In step S1016, the system control unit 50 hides the menu displayed on the display unit 28.

In step S1017, the system control unit 50 determines whether to continue the processing of this flowchart. If the system control unit 50 determines to continue the processing of this flowchart, the processing proceeds to step S1002. If the system control unit 50 determines not to continue the processing of this flowchart (for example, if a specific button is pressed), the processing of this flowchart ends.

Second-Item-Group Setting Change Processing

Processing of steps S1101 to S1110 (processing for changing the settings of the second item group) will be described with reference to FIG. 11A.

In step S1101, as illustrated in FIG. 5 (as in step S1003), the system control unit 50 displays an LV image enlarged at a predetermined display magnification (magnification higher than a magnification of 1×) such that a predetermined position on the LV image is positioned at the center of the display surface of the display unit 28.

In step S1102, as illustrated in FIG. 9, the system control unit 50 displays a screen (setting change screen) for changing the selected setting item on the display unit 28, the setting change screen including the enlarged LV image.

In step S1103, the system control unit 50 determines whether a setting change operation has been performed. If the system control unit 50 determines that the setting change operation has been performed, the processing proceeds to step S1104. If the system control unit 50 determines that the setting change operation has not been performed, the processing proceeds to step S1105.

In step S1104, the system control unit 50 changes the setting in accordance with the setting change operation.

In step S1105, the system control unit 50 determines whether a display-magnification change operation has been performed. If the system control unit 50 determines that the display-magnification change operation has been performed, the processing proceeds to step S1106. If the system control unit 50 determines that the display-magnification change operation has not been performed, the processing proceeds to step S1107.

In step S1106, the system control unit 50 displays the LV image on the display unit 28 at the display magnification in accordance with the display-magnification change operation.

In step S1107, the system control unit 50 determines whether the LV image is in an enlarged state (the magnification of the LV image is higher than a magnification of 1×). If the system control unit 50 determines that the LV image is in the enlarged state, the processing proceeds to step S1108. If the system control unit 50 determines that the LV image is not in the enlarged state, the processing proceeds to step S1110.

In step S1108, the system control unit 50 determines whether an operation for changing an enlargement position (a center position of the LV image to be enlarged and displayed; a center position of a range of the LV image to be displayed) has been performed. If the system control unit 50 determines that this enlargement-position change operation has been performed, the processing proceeds to step S1109. If the system control unit 50 determines that the enlargement-position change operation has not been performed, the processing proceeds to step S1110.

In step S1109, the system control unit 50 changes the enlargement position in accordance with the enlargement-position change operation. The system control unit 50 moves the LV image such that the changed enlargement position on the LV image is positioned at the center position of the display surface of the display unit 28.

In step S1110, the system control unit 50 determines whether the change of a setting (setting value) is continued. If the system control unit 50 determines that the setting change is continued, the processing proceeds to step S1103. If the system control unit 50 determines that the setting change is not continued, the processing proceeds to step S1014.

First-Item-Group Setting Change Processing

Figure 11B:
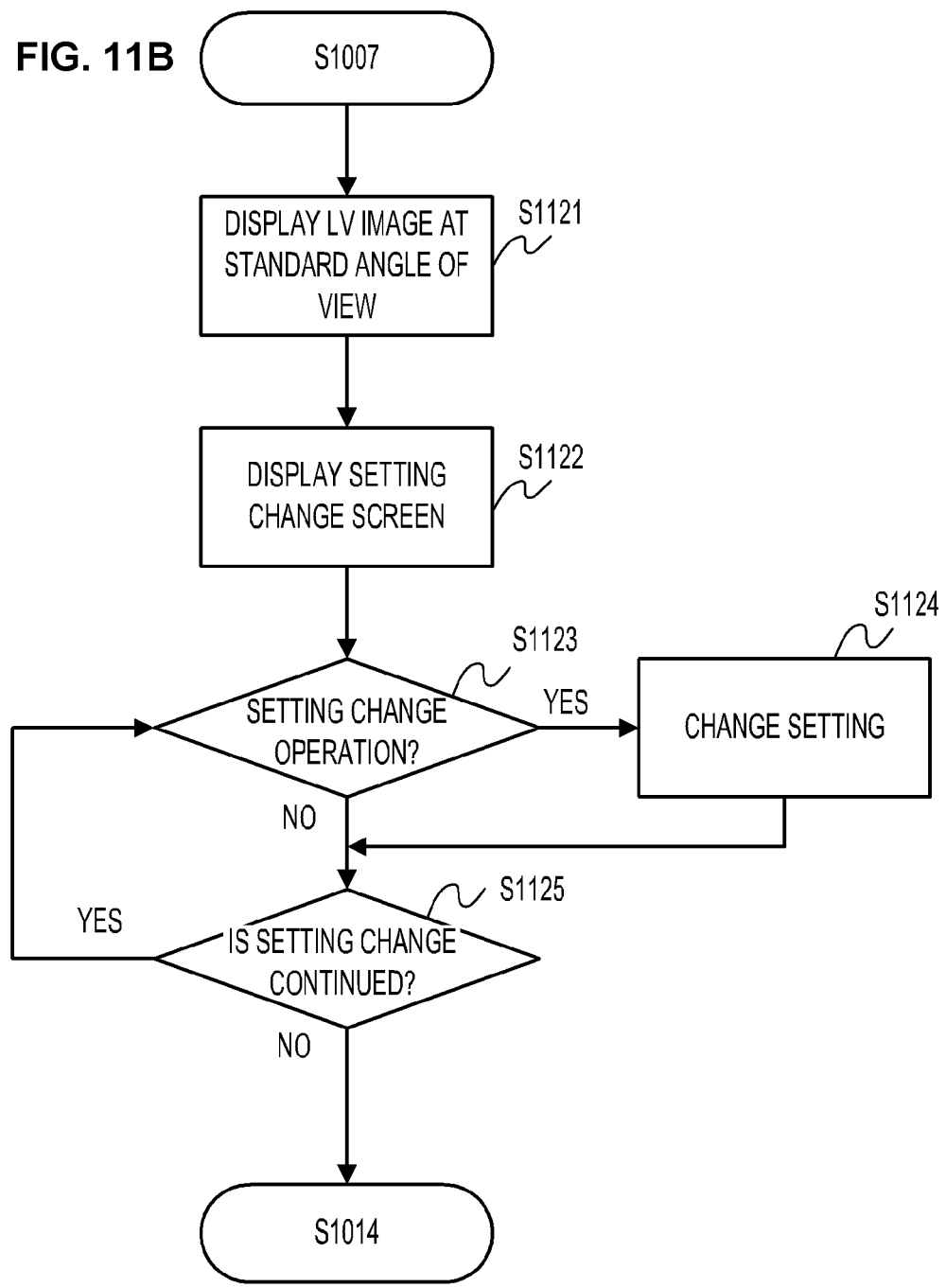

Processing of steps S1121 to S1125 (processing for changing the settings of the first item group) will be described with reference to FIG. 11B.

In step S1121, as illustrated in FIG. 4, the system control unit 50 displays the LV image at the standard angle of view on the display unit 28. That is, the display unit 28 displays the LV image at a magnification of 1× such that both the image area of the right image and the image area of the left image are displayed thereon. Note that the LV image to be displayed is not limited to the LV image at the standard angle of view (standard image at a magnification of 1×). For example, the LV image may be enlarged (or reduced) from a magnification of 1× so as to be displayed in a range in which the entire image area of the right image and the entire image area of the left image are displayed.

In step S1122, as illustrated in FIG. 8, the system control unit 50 displays a setting change screen of the selected setting item on the display unit 28, the setting change screen including the LV image at the standard angle of view.

In step S1123, the system control unit 50 determines whether the setting change operation has been performed. If the system control unit 50 determines that the setting change operation has been performed, the processing proceeds to step S1124. If the system control unit 50 determines that the setting change operation has not been performed, the processing proceeds to step S1125.

In step S1124, the system control unit 50 changes the setting in accordance with the setting change operation.

In step S1125, the system control unit 50 determines whether the setting change is continued. If the system control unit 50 determines that the setting change is continued, the processing proceeds to step S1123. If the system control unit 50 determines that the setting change is not continued, the processing proceeds to step S1014.

Third-Item-Group Setting Change Processing

Figure 12:
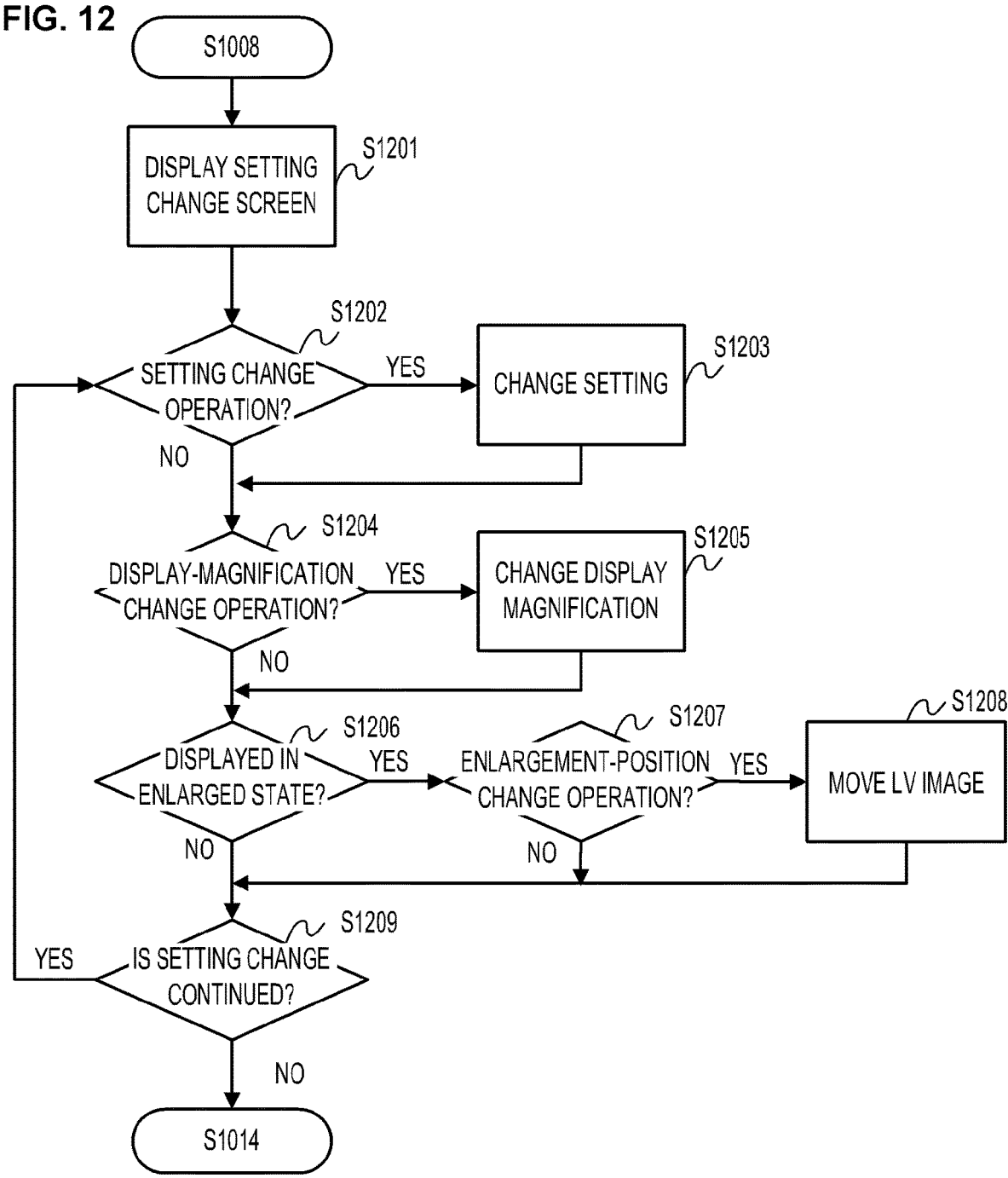
FIG. 12 is a flowchart illustrating setting change processing after a setting item is selected.

Processing of steps S1201 to S1209 (processing for changing the settings of the third item group) will be described with reference to FIG. 12.

In step S1201, the system control unit 50 displays a setting change screen of the selected setting item on the display unit 28. When the setting item of the third item group is selected, the LV image maintaining a state (angle of view; display magnification) immediately before the selecting of the setting item continues to be displayed (that is, the display magnification is not changed).

In step S1202, the system control unit 50 determines whether the setting change operation has been performed. If the system control unit 50 determines that the setting change operation has been performed, the processing proceeds to step S1203. If the system control unit 50 determines that the setting change operation has not been performed, the processing proceeds to step S1204.

In step S1203, the system control unit 50 changes the setting in accordance with the setting change operation.

In step S1204, the system control unit 50 determines whether a display-magnification change operation has been performed. If the system control unit 50 determines that the display-magnification change operation has been performed, the processing proceeds to step S1205. If the system control unit 50 determines that the display-magnification change operation has not been performed, the processing proceeds to step S1206.

In step S1205, the system control unit 50 displays the LV image on the display unit 28 at the display magnification in accordance with the display-magnification change operation.

In step S1206, the system control unit 50 determines whether the LV image is in an enlarged state (the magnification of the LV image is higher than a magnification of 1×). If the system control unit 50 determines that the LV image is in the enlarged state, the processing proceeds to step S1207. If the system control unit 50 determines that the LV image is not in the enlarged state, the processing proceeds to step S1209.

In step S1207, the system control unit 50 determines whether an operation for changing an enlargement position (a center position of the LV image to be enlarged and displayed) has been performed. If the system control unit 50 determines that the enlargement-position change operation has been performed, the processing proceeds to step S1208. If the system control unit 50 determines that the enlargement-position change operation has not been performed, the processing proceeds to step S1209.

In step S1208, the system control unit 50 changes the enlargement position in accordance with the enlargement-position change operation. The system control unit 50 moves the LV image such that the changed enlargement position of the LV image is positioned at the center position of the display surface of the display unit 28.

In step S1209, the system control unit 50 determines whether the change of a setting value is continued. If the system control unit 50 determines that the change of a setting value is continued, the processing proceeds to step S1202. If the system control unit 50 determines that the change of a setting value is not continued, the processing proceeds to step S1014.

As described above, the display magnification and the display range of the LV image is changed (the LV image is enlarged and displayed, or the entire angle of view of the LV image is displayed) in accordance with the setting item (menu item) selected by the user when the dual-lens unit is attached (when the dual-lens image is displayed). As a result, the LV image having a display magnification and a display range that allow the user to easily perform the setting (operation) is displayed in accordance with the selected setting item. Therefore, the operability of the user is improved.

In addition, the present embodiment is particularly effective when the size of the display surface of the display unit 28 is not sufficient. For example, in a case where an image is externally output to a display device having a large display surface via HDMI (registered trademark) or the like, the necessity of the enlarged display of an LV image is low. Therefore, in a case where the display surface of the display unit 28 is larger than a specific size, even when any one of the selection items of the second item group is selected in step S1006, the processing may proceed to step S1121 or S1201, without proceeding to step S1101. The case where the display surface of the display unit 28 is larger than a specific size refers to, for example, a case where the lengths of all four sides of the display surface of the display unit 28 are greater than a predetermined length.

According to the present invention, an image including two areas having a parallax therebetween can be displayed such that a user can easily perform desired processing thereon.

In the above description, "if A is equal to or more than B, the processing proceeds to step S1, and if A is smaller (lower) than B, the processing proceeds to step S2" may be read as "if A is larger (higher) than B, the processing proceeds to S1, and if A is equal to or less than B, the processing proceeds to step S2". Conversely, "if A is larger (higher) than B, the processing proceeds to step S1, and if A is equal to or less than B, the processing proceeds to step S2" may be read as "if A is equal to or more than B, the processing proceeds to step S1, and if A is smaller (lower) than B, the processing proceeds to step S2". Therefore, unless a contradiction arises, the expression "A or more" may be replaced by "A or larger (higher; longer; more) than A", or may be read as or may be replaced by "larger (higher; longer; more) than A". In addition, the expression "A or less" may be replaced by "A or smaller (lower; shorter; less) than A" or may be replaced by or may be read as "smaller (lower; shorter; less) than A". Further, "larger (higher; longer; more) than A" may be read as "A or more", and "smaller (lower; shorter; less) than A" may be read as "A or less".

The present invention has thus been described in detail based on the preferred embodiments thereof. However, the present invention is not limited to these specific embodiments, and various embodiments within the scope not departing from the gist of the present invention are also included in the present invention. Some of the above-described embodiments may be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-111787, filed on Jul. 12, 2022, which is hereby incorporated by reference herein in its entirety.

What is claimed is:

1. An information processing apparatus comprising:
a processor; and
a memory storing a program which, when executed by the processor, causes the information processing apparatus to:
(1) acquire a captured image;
(2) control a display to display a first item and a second item together with the captured image, each of the first item and the second item including a plurality of setting items;
(3) determine whether the captured image is a dual-lens image that includes a first area acquired by imaging through a first shooting lens and a second area acquired by imaging through a second shooting lens, the second area having a parallax with respect to the first area;
(4) control the display to display both the first area and the second area of the captured image at a first display magnification in a case where the captured image is determined to be the dual-lens image and a setting item, included in the first item and related to a setting of a display item, is selected; and
(5) control the display to display only one of the first area and the second area of the captured image at a second display magnification higher than the first display magnification in a case where the captured image is determined to be the dual-lens image and a setting item, included in the second item and related to a setting of image processing at image capturing, is selected.

2. The information processing apparatus according to claim 1, wherein the program when executed by the processor further causes the information processing apparatus to;
control the display to display a third item that includes a plurality of setting items and that is different from both of the first item and the second item; and
control the display to display the captured image maintaining a state immediately before selecting of the setting item, in a case where any one of the setting items of the third item is selected.

3. The information processing apparatus according to claim 2, wherein the third item includes a setting item related to a setting of the display.

4. The information processing apparatus according to claim 1, wherein the program when executed by the processor further causes the information processing apparatus to acquire the captured image by image capturing.

5. The information processing apparatus according to claim 4, wherein the second item includes a setting item related to a setting for adjusting color, sharpness, and knee.

6. The information processing apparatus according to claim 1, wherein the first item includes at least one of an assist function for indicating a specific position in a captured image, a changing function for changing a brightness of a display surface of the display, and a function for mirror-reversed displaying on the display.

7. The information processing apparatus according to claim 1, wherein the program when executed by the processor further causes the information processing apparatus not to, in a case where a display surface of the display is larger than a specific size, control the display to display only one of the first area and the second area even in a case where any one of the setting items of the second item is selected.

8. The information processing apparatus according to claim 1, wherein the program when executed by the processor further causes the information processing apparatus to, in a case where the captured image is determined to be not the dual-lens image, control the display to display the captured image maintaining a state immediately before selecting of the setting item even in a case where any one of the setting items of the first item and the second item is selected.

9. The information processing apparatus according to claim 1, wherein the program when executed by the processor further causes the information processing apparatus to;
control the display to display a first setting change screen including the captured image in a case where any one of the setting items of the first item is selected; and
control the display to display a second setting change screen including the captured image in a case where any one of the setting items of the second item is selected.

10. The information processing apparatus according to claim 9, wherein in a case where the first setting change screen is displayed on the display, a display magnification of the captured image is not changeable by a user, and
wherein in a case where the second setting change screen is displayed on the display, the display magnification of the captured image is changeable by the user.

11. An information processing method comprising:
acquiring a captured image;
controlling a display to display a first item and a second item together with the captured image, each of the first item and the second item including a plurality of setting items;
determining whether the captured image is a dual-lens image that includes a first area acquired by imaging through a first shooting lens and a second area acquired by imaging through a second shooting lens, the second area having a parallax with respect to the first area;
controlling the display to display both the first area and the second area of the captured image at a first display magnification in a case where the captured image is determined to be the dual-lens image and a setting item, included in the first item and related to a setting of a display item, is selected; and
controlling the display to display only one of the first area and the second area of the captured image at a second display magnification higher than the first display magnification in a case where the captured image is determined to be the dual-lens image and a setting item, included in the second item and related to a setting of image processing at image capturing, is selected.

12. A non-transitory computer-readable medium that stores a program, wherein the program causes a computer to execute an information processing method, the information processing method comprising:
acquiring a captured image;
controlling a display to display a first item and a second item together with the captured image, each of the first item and the second item including a plurality of setting items;
determining whether the captured image is a dual-lens image that includes a first area acquired by imaging through a first shooting lens and a second area acquired by imaging through a second shooting lens, the second area having a parallax with respect to the first area;
controlling the display to display both the first area and the second area of the captured image at a first display magnification in a case where the captured image is determined to be the dual-lens image and a setting item, included in the first item and related to a setting of a display item, is selected; and
controlling the display to display only one of the first area and the second area of the captured image at a second display magnification higher than the first display magnification in a case where the captured image is determined to be the dual-lens image and a setting item, included in the second item and related to a setting of image processing at image capturing, is selected.

13. An information processing apparatus comprising:
a processor; and
a memory storing a program which, when executed by the processor, causes the information processing apparatus to:
(1) acquire a captured image;
(2) receive a selection operation of any one of a first item and a second item different from the first item, each of the first item and the second item including a plurality of setting items;
(3) determine whether the captured image is a dual-lens image that includes a first area acquired by imaging through a first shooting lens and a second area acquired by imaging through a second shooting lens, the second area having a parallax with respect to the first area;
(4) control a display to display both the first area and the second area of the captured image at a first display magnification in a case where the captured image is determined to be the dual-lens image and a setting item, included in the first item and related to a setting of a display item, is selected; and (5) control the display to display only one of the first area and the second area of the captured image at a second display magnification higher than the first display magnification in a case where the captured image is determined to be the dual-lens image and a setting item, included in the second item, is selected.

14. The information processing apparatus according to claim 13, wherein the second item includes a setting item related to a setting of image processing at image capturing.

15. The information processing apparatus according to claim 13, wherein the program when executed by the processor further causes the information processing apparatus to control the display to display the first item and the second item together with the captured image.

16. An information processing method comprising:
acquiring a captured image;
receiving a selection operation of any one of a first item and a second item different from the first item, each of the first item and the second item including a plurality of setting items;
determining whether the captured image is a dual-lens image that includes a first area acquired by imaging through a first shooting lens and a second area acquired by imaging through a second shooting lens, the second area having a parallax with respect to the first area;
controlling a display to display both the first area and the second area of the captured image at a first display magnification in a case where the captured image is determined to be the dual-lens image and a setting item, included in the first item and related to a setting of a display item, is selected; and
controlling the display to display only one of the first area and the second area of the captured image at a second display magnification higher than the first display magnification in a case where the captured image is determined to be the dual-lens image and a setting item, included in the second item, is selected.

* * * * *